(12) United States Patent
Kief et al.

(10) Patent No.: US 8,289,648 B2
(45) Date of Patent: Oct. 16, 2012

(54) MAGNETIC RECORDING HEAD WITH LAYERED STRUCTURE IN WRITE GAP

(75) Inventors: Mark Thomas Kief, Lakeville, MN (US); Sharat Batra, Plymouth, MN (US); Inturi Venkateswara Rao, Shakopee, MN (US)

(73) Assignee: Seagate Technology LLC, Cupertino, CA (US)

( * ) Notice: Subject to any disclaimer, the term of this patent is extended or adjusted under 35 U.S.C. 154(b) by 897 days.

(21) Appl. No.: 12/389,652

(22) Filed: Feb. 20, 2009

(65) Prior Publication Data
US 2010/0214692 A1    Aug. 26, 2010

(51) Int. Cl.
*G11B 5/127*    (2006.01)
(52) U.S. Cl. .................. 360/125.12; 360/125.3
(58) Field of Classification Search .......... None
See application file for complete search history.

(56) References Cited

U.S. PATENT DOCUMENTS

| | | | |
|---|---|---|---|
| 4,803,580 A * | 2/1989 | Mowry | 360/317 |
| 4,814,921 A | 3/1989 | Hamakawa et al. | |
| 6,233,116 B1 * | 5/2001 | Chen et al. | 360/125.5 |
| 6,456,467 B1 * | 9/2002 | Mao et al. | 360/319 |
| 6,791,794 B2 | 9/2004 | Honjo et al. | |
| 6,791,796 B2 | 9/2004 | Shukh et al. | |
| 6,813,115 B2 | 11/2004 | Van der Heijden et al. | |
| 6,870,712 B2 | 3/2005 | Chen et al. | |
| 7,031,121 B2 | 4/2006 | Khera et al. | |
| 7,054,105 B2 | 5/2006 | Mochizuki et al. | |
| 7,057,837 B2 | 6/2006 | Gill | |
| 7,159,302 B2 * | 1/2007 | Feldbaum et al. | 29/603.12 |
| 7,180,705 B2 | 2/2007 | Matono et al. | |
| 7,228,619 B2 | 6/2007 | Le | |
| 7,292,414 B1 * | 11/2007 | Mallary | 360/324 |
| 7,369,360 B2 * | 5/2008 | Vas'ko et al. | 360/125.12 |
| 7,388,732 B2 | 6/2008 | Le | |
| 7,554,765 B2 * | 6/2009 | Shukh et al. | 360/125.12 |
| 7,561,379 B2 * | 7/2009 | Li et al. | 360/125.24 |
| 8,004,794 B2 * | 8/2011 | Zhou et al. | 360/125.31 |
| 2003/0026040 A1 * | 2/2003 | Covington et al. | 360/126 |
| 2006/0098334 A1 * | 5/2006 | Jayasekara et al. | 360/125 |
| 2006/0164759 A1 * | 7/2006 | Okada et al. | 360/126 |
| 2006/0262594 A1 * | 11/2006 | Fukumoto | 365/158 |
| 2007/0177301 A1 | 8/2007 | Han et al. | |
| 2009/0141397 A1 * | 6/2009 | Hsiao et al. | 360/119.02 |

* cited by examiner

*Primary Examiner* — Kevin Bernatz
(74) *Attorney, Agent, or Firm* — Westman, Champlin & Kelly, P.A.

(57) ABSTRACT

The present disclosure provides a magnetic recording head for a data storage system having improved write field characteristics. In one example, an apparatus having magnetic properties is provided. The apparatus includes a pole, a shield, and a multilayer block positioned between the pole and the shield. The multilayer block includes a plurality of layers wherein at least one of the plurality of layers comprises a magnetic material. In one embodiment, the multilayer block provides an antiferromagnetic coupling between the pole and the shield such that a magnetization of the pole is in a first direction and a magnetization of the shield in a second direction that is substantially anti-parallel to the first direction.

20 Claims, 13 Drawing Sheets

MAGNETIC RECORDING HEAD WITH LAYERED STRUCTURE IN WRITE GAP

BACKGROUND

One example of a data storage system that uses magnetic fields for writing and reading data is a disc drive having one or more sliders that are positioned over a data storage medium (i.e., one or more discs). Sliders carry transducers which write information to and read information from data surfaces of the discs.

In one example, transducers include a recording or write head for generating a magnetic field that aligns the magnetic moments of a magnetic medium to represent desired bits of data. In addition, transducers can include a read element that is configured to sense magnetic flux transitions recorded to data tracks on the medium which represent the bits of data.

Magnetic recording heads include both longitudinal and perpendicular recording techniques, for example. Perpendicular recording is a form of magnetic recording in which magnetic moments representing bits of data are oriented perpendicularly to the surface of the recording layer, whereas with longitudinal recording the magnetic moments are oriented longitudinally along a track of the medium.

Perpendicular magnetic write heads typically include main and return poles that are separated to form a write gap and extend from pole tips located at an air-bearing surface (ABS) to a back gap region. A back gap closure typically connects the main and return poles together at the back gap region to form a magnetically conductive path therebetween. A coil is included to generate magnetic signals through the main and return poles in response to a current conducted through the coil. The magnetic signals are focused by the main pole tip such that they interact with the magnetic medium to orient its magnetic moments in an up or down direction (for example).

As components in data storage systems continue to decrease in size and densities on the magnetic medium increase, improved transducer designs are needed.

SUMMARY

In one exemplary embodiment, an apparatus having magnetic properties is provided. The apparatus includes a pole, a shield, and a multilayer block positioned between the pole and the shield. The multilayer block includes a plurality of layers wherein at least one of the plurality of layers comprises a magnetic material.

In another exemplary embodiment, a transducer is provided. The transducer includes a first magnetic element, a second magnetic element spaced apart from the first magnetic element to define a gap therebetween, and a multilayer block positioned in the gap. The multilayer block includes at least two layers of ferromagnetic material spaced apart by a non-magnetic spacer layer.

In another exemplary embodiment, an apparatus is provided comprising a magnetic pole, a magnetic shield, and an antiferromagnetic superlattice positioned between the magnetic pole and magnetic shield. The antiferromagnetic superlattice orients the magnetizations of the magnetic pole and magnetic shield to be substantially anti-parallel to each other.

These and various other features and advantages will be apparent from a reading of the following Detailed Description. This Summary is not intended to identify key features or essential features of the claimed subject matter, nor is it intended to be used as an aid in determining the scope of the claimed subject matter. The claimed subject matter is not limited to implementations that solve any or all disadvantages noted in the background.

DETAILED DESCRIPTION OF ILLUSTRATIVE EMBODIMENTS

The dimensions of write head components are often decreased to achieve increased track and linear recording density. For example, a width of a perpendicular writer pole and/or gap(s) between components are often decreased to accommodate higher recording densities. This can result in reduced write pole saturation and/or a weakened write field, for example. Moreover, the narrowing gap(s) between components (e.g., main pole, return pole, front writer shield, etc.) can result in increased shunting of the write pole and magnetic field leakage, which can also decrease the write field. These effects on the write field can cause data errors.

Figure 1:
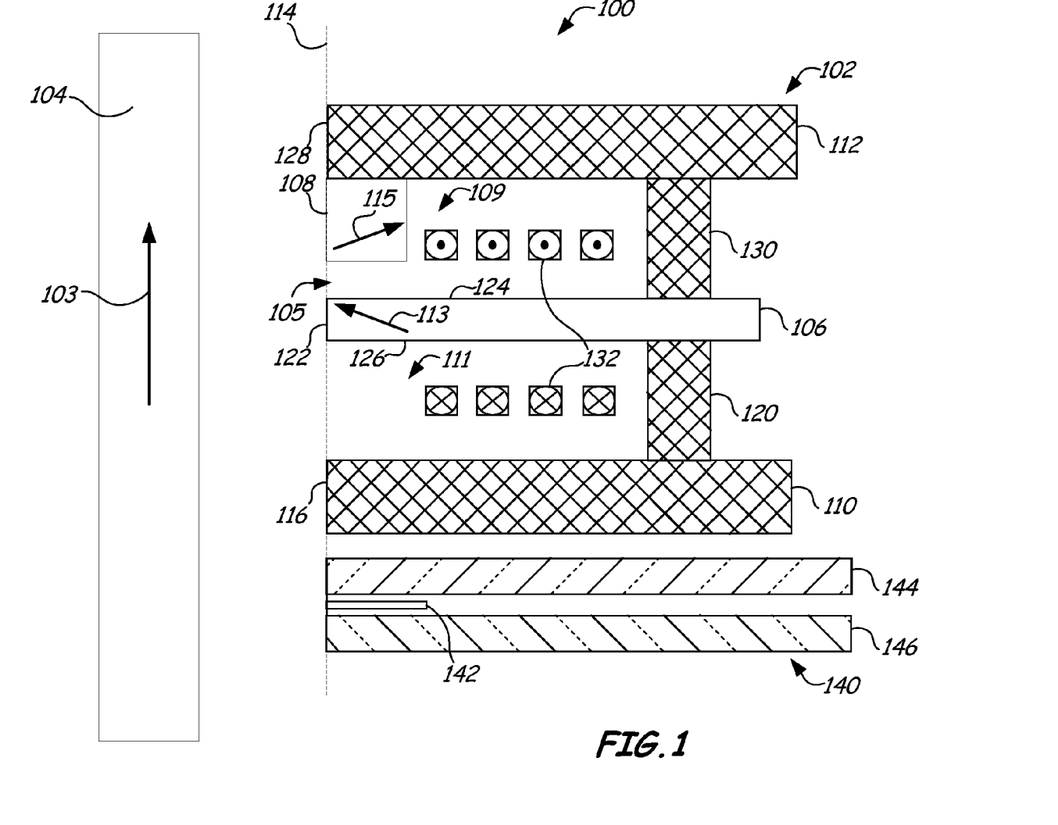
FIG. 1 is a sectional view of a portion of an exemplary writer for perpendicular recording to a medium.

FIG. 1 illustrates a partial sectional view of an exemplary read/write transducer 100. In FIG. 1, some or all spacing and insulating layers are omitted for clarity. Transducer 100 includes a writer 102 configured for perpendicular recording to a medium 104. In the illustrated embodiment, writer 102 includes a main pole 106 and at least one return pole. Main pole 106 includes a surface that defines a portion of an air-bearing surface (ABS) 114 of writer 102 and is positioned over a portion of data storage medium 104 for recording data thereon. Main pole 106 comprises a ferromagnetic material such as, but not limited to, iron (Fe), cobalt (Co), nickel (Ni), and combinations thereof. For example, main pole 106 can comprise an alloy such as, but not limited to, iron cobalt (FeCo), iron nickel (FeNi), cobalt iron nickel (CoFeNi), and the like.

In the embodiment of FIG. 1, writer 102 includes multiple return poles. With respect to the movement (represented by numeral 103) of medium 104, a first return pole 110 comprises a "leading" pole and is positioned on the leading side of main pole 102. Further, a second return pole 112 comprises a "trailing" pole and is positioned on the trailing side of main pole 102.

As illustrated in FIG. 1, first return pole 110, having a first return pole tip 116, is separated from main pole 106 and connected at a first back gap closure 120. Main pole 106 includes a main pole tip 122 having a trailing edge 124 and a leading edge 126. Second return pole 112 is positioned on the opposite side of main pole 106 than first return pole 110. Second return pole 112 is spaced apart from trailing edge 124 of main pole tip 122. Second return pole 112, having a second return pole tip 128, is separated from main pole 106 and connected at a second back gap closure 130.

In the embodiment of FIG. 1, a conductive coil 132 wraps around main pole 106 to extend between main pole 106 and first return pole 110 and between main pole 106 and return pole 112. Examples of conductive coil 132 include, but are not limited to, solenoid and pancake coils. In one embodiment, an insulating material (not shown) electrically insulates conductive coil 132 from main pole 106 and return pole 110 and from main pole 106 and return pole 112. However, any suitable configuration of conductive coil 132 can be utilized. For example, conductive coil 132 can comprise a plurality of coils (e.g., two coils). In one instance, a coil can extend between first return pole 110 and main pole 106 and around back gap closure 120 and/or a coil can extend between second return pole 112 and main pole 106 and around back gap closure 130.

In the illustrated embodiment, a magnetic circuit is formed in writer 102 by main pole 106, first return pole 110, second return pole 112, back gap closures 120 and 130, and a soft magnetic layer of medium 104. In operation, an electrical current is caused to flow in conductive coil 132, which induces a magnetic flux that is conducted through the magnetic circuit. The magnetic circuit causes the magnetic flux to travel (e.g., vertically, substantially vertically) through the main pole tip 122 and a storage layer of medium 104. The magnetic flux is directed horizontally through the soft magnetic layer and vertically back through the storage layer through the pole tips of the return pole(s). The magnetic flux is conducted back to main pole 106 through back gap closures 120 and/or 130.

It is noted that while writer 102 is illustrated as including multiple return poles, in other embodiments writer 102 can include a single return pole. For example, writer 102 can include a single return pole 110. In another example, writer 102 can include a single return pole 112. Further, in one example writer 102 includes a single back gap closure (e.g., back gap closure 120 or 130). A coil can be provided between the main pole and the single return pole and wrapped around the back gap closure to induce a magnetic flux. In one embodiment, writer 102 does not include a return pole.

In the embodiment of FIG. 1, return pole 112 is spaced apart from main pole 106 to define a writer gap 109 therebetween and return pole 110 is spaced apart from main pole 106 to define a writer gap 111 therebetween. Writer 102 also includes at least one writer shield 108 that is configured to assist the operation of main pole 106 to improve the write field characteristics (e.g., write field gradient and/or magnitude) for perpendicular recording. As illustrated, writer shield 108 comprises a first shield that is positioned proximate to, but spaced apart from, the main pole 106. Writer shield 108 is positioned between the main pole 106 and the return pole 112 and is referred to herein as a "front" shield. Alternatively, or in addition, a writer shield can comprise a "back" shield positioned between the leading return pole 110 and the main pole 106.

Writer shield 108 can be connected to or spaced apart from the return pole 112. Further, writer shield 108 is formed of a layer of magnetic material. In the illustrated embodiment, writer shield 108 is formed of a ferromagnetic material, such as the materials discussed above that can be used to form the main pole 106. In one particular example, the main pole 106 and writer shield 108 are both formed of a high moment alloy, such as Fe60Co40.

Read/write transducer 100 also includes a reader 140. Reader 140 includes a read sensor 142 that is spaced between a top shield 144 and a bottom shield 146. Top and bottom shields 144 and 146 operate to isolate read sensor 142 from external magnetic fields that could affect sensing bits of data that have been recorded on medium 104. While reader 140 is illustrated as including top and bottom shields 144 and 146 that are separate from writer 102, it should be noted that in other embodiments return pole 110 can operate as a top shield for reading element 140.

In the example of FIG. 1, a gap 105 between main pole 106 and writer shield 108 includes a non-magnetic gap comprising, for example, a dielectric, metal, or combination thereof. The non-magnetic gap 105 of FIG. 1 is a passive element that provides a physical spacing between main pole 106 and shield writer 108. FIG. 1 illustrates an exemplary magnetization of main pole 106 and writer shield 108 during a write operation to medium 104. Main pole 106 is magnetized in a direction represented by arrow 113 and writer shield 108 is magnetized in a direction represented by arrow 115. Magnetization direction 113 is opposed, to some extent, to the magnetization direction 115 of writer shield 108. However, the alignment between the magnetizations 113 and 115 is incomplete as the magnetizations 113 and 115 are neither anti-parallel nor perpendicular to the surface of storage medium 104. Thus, the magnetic field generated by main pole 106 for recording data to the storage medium 104 is not substantially perpendicular to the surface of the medium 104 which can reduce the write field gradient and/or magnitude.

Figure 2:
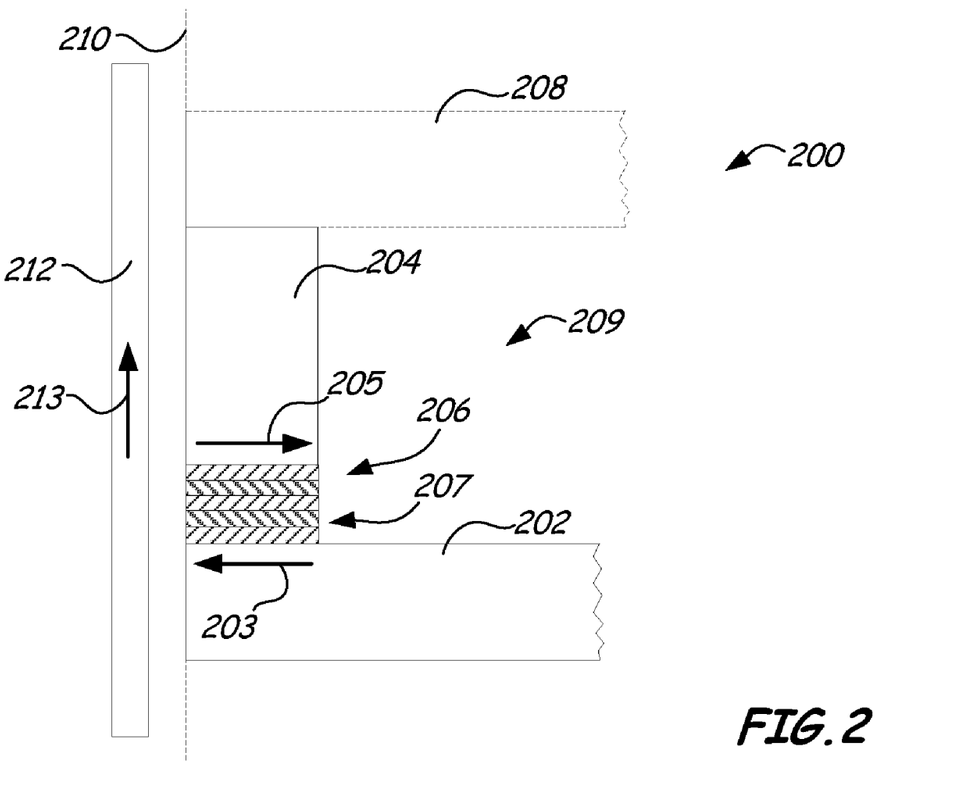
FIG. 2 is a sectional view of a portion of an exemplary writer having an antiferromagnetic gap material.

In accordance with one embodiment, a writer includes one or more materials for improving the write field characteristics. For example, a gap between a writer pole (e.g., a main pole) and writer shield (e.g., a "front" shield, a "back" shield) includes one or more materials configured to orient the magnetizations of the writer pole and writer shield to improve the write field gradient and/or write field magnitude. FIG. 2 illustrates a writer 200 having a writer pole 202 (i.e., a main pole) and a writer shield 204 (in this embodiment shown as a "front" shield) that are spaced apart to define a gap 206 therebetween. Pole 202 and shield 204 are illustratively similar to main pole 106 and writer shield 108 illustrated in FIG. 1, respectively. In the embodiment of FIG. 2, the shield 204 is positioned in a write gap 209 between a return pole 208 and the main pole 202. Arrow 213 represents a direction of movement of storage medium 212.

A multilayer block 207 is positioned in the gap 206 and provides an antiferromagnetic coupling between the pole 202 and shield 204 that increases the anti-parallel alignment of the magnetizations 203 and 205 of the pole and shield, respectively. As illustrated, the magnetization 203 of the write pole 202 and the magnetization 205 of the write shield 204 are aligned substantially anti-parallel and are substantially perpendicular to the storage medium 212.

As illustrated, multilayer block 207 comprises a plurality of layers. Multilayer block 207 provides an antiferromagnetic coupling between adjacent magnetic elements or devices, and is herein referred to as an antiferromagnetic superlattice. In the embodiment of FIG. 2, the antiferromagnetic superlattice 207 operates to align the magnetizations of the write pole 202 and write shield 204. As illustrated, each of the plurality of layers of material of antiferromagnetic superlattice 207 define a plane that is substantially perpendicular to the air-bearing surface 210 and to the storage medium 212.

The plurality of layers of antiferromagnetic superlattice 207 includes at least one layer of magnetic material and at least one layer of non-magnetic material. The magnetic layers can include ferromagnetic materials, such as, but not limited to, iron (Fe), cobalt (Co), nickel (Ni), and/or combinations thereof. For example, one or more of the magnetic layers can comprise an alloy such as, but not limited to, iron cobalt (FeCo), iron nickel (FeNi), cobalt iron nickel (CoFeNi), and the like. Further, it is noted that a first layer of magnetic material can have the same or a different material composition as a second layer of magnetic material in the superlattice 207. For example, one layer of magnetic material can comprise an iron-cobalt (FeCo) alloy while another layer of magnetic material can comprise an iron-nickel (FeNi) alloy. Additionally, it is also noted that one or more of the magnetic layers can comprise thin multilayers, such as Co/Ni/Co and Fe/Ni/Fe.

Further, the non-magnetic layers can include non-ferromagnetic materials. The layers of non-ferromagnetic material provide an interlayer exchange coupling that provides an antiferromagnetic exchange between adjacent ferromagnetic layers. Examples of non-ferromagnetic materials include, but not limited to, ruthenium (Ru), chromium (Cr), iridium (Ir), rhodium (Rh), copper (Cu), manganese (Mn), silver (Ag), gold (Au), and/or combinations thereof. Further, it is noted that a first layer of non-magnetic material can have the same or a different material composition as a second layer of non-magnetic material in the superlattice 207. For example, one layer of non-magnetic material can comprise ruthenium (Ru) while another layer of non-magnetic material can comprise chromium (Cr).

Figure 3A:
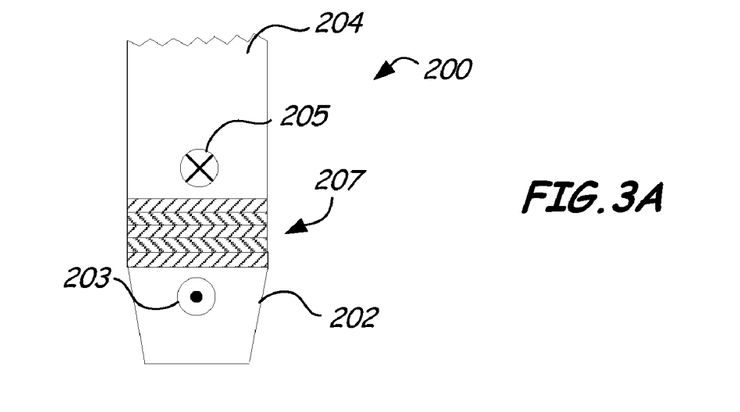
FIGS. 3A-3C are views of the exemplary writer illustrated in FIG. 2 taken from the air-bearing surface (ABS).
Figure 3B:
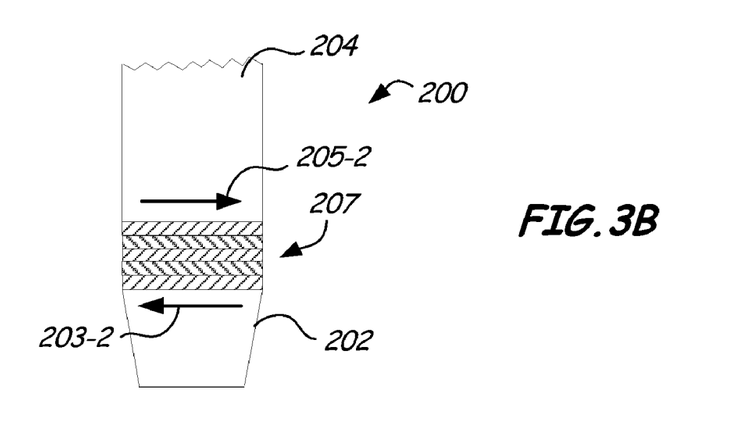
Figure 3C:
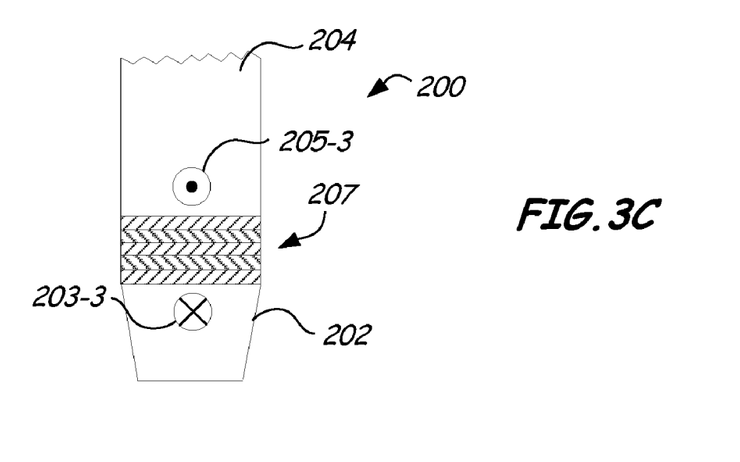

In one embodiment, the antiferromagnetic superlattice 207 operates upon the write pole 202 and front shield 204 magnetizations independent of the write pole 202 magnetization direction 203. For instance, the antiferromagnetic superlattice 207 operates continuously and preferentially maintains anti-parallel alignment of the magnetizations 203 and 205 when the write pole 202 is driven toward positive saturation, negative saturation, in between positive and negative saturation, and in remanence. FIGS. 3A-3C illustrate write pole 202 in various magnetization states.

FIGS. 3A-3C are views of a portion of writer 200 taken from the air-bearing surface (ABS) 210. In FIG. 3A, the writer 200 is driven towards positive saturation (i.e., magnetization 203 is oriented toward the storage medium 212). The magnetization 205 of the write shield 204 and magnetization 203 of the write pole 202 are oriented substantially anti-parallel and are substantially perpendicular to the surface storage medium. In FIG. 3B, writer 200 is illustrated in remanence (i.e., writer 200 is not being magnetized to record data to the storage medium 212). As illustrated, a magnetization 203-2 of write pole 202 and magnetization 205-2 of write shield 204 during remanence are substantially anti-parallel. Magnetizations 203-2 and 205-2 are also parallel to the storage medium 212. In FIG. 3C, writer 200 is driven towards negative saturation in which a magnetization 203-3 of write pole 202 is oriented away from the storage medium 212. The magnetization 205-3 of write shield 204 is substantially anti-parallel to magnetization 203-3 and is oriented toward the storage medium 212. Magnetizations 203-3 and 205-3 are substantially perpendicular to the storage medium.

As illustrated in FIGS. 3A-3C, the antiferromagnetic superlattice 207 aligns the magnetization of the writer 200 to reduce flux leakage across the gap 206 and flux leakage from the pole and yoke regions into the write shield. Block 207 can enable a faster dynamic write response of the writer 200 as a result of the cooperative action of the write pole and write shield magnetizations. Moreover, the antiferromagnetic superlattice 207 can also operate to reduce, or prevent, the occurrence of erase after write (EAW).

Figure 4:
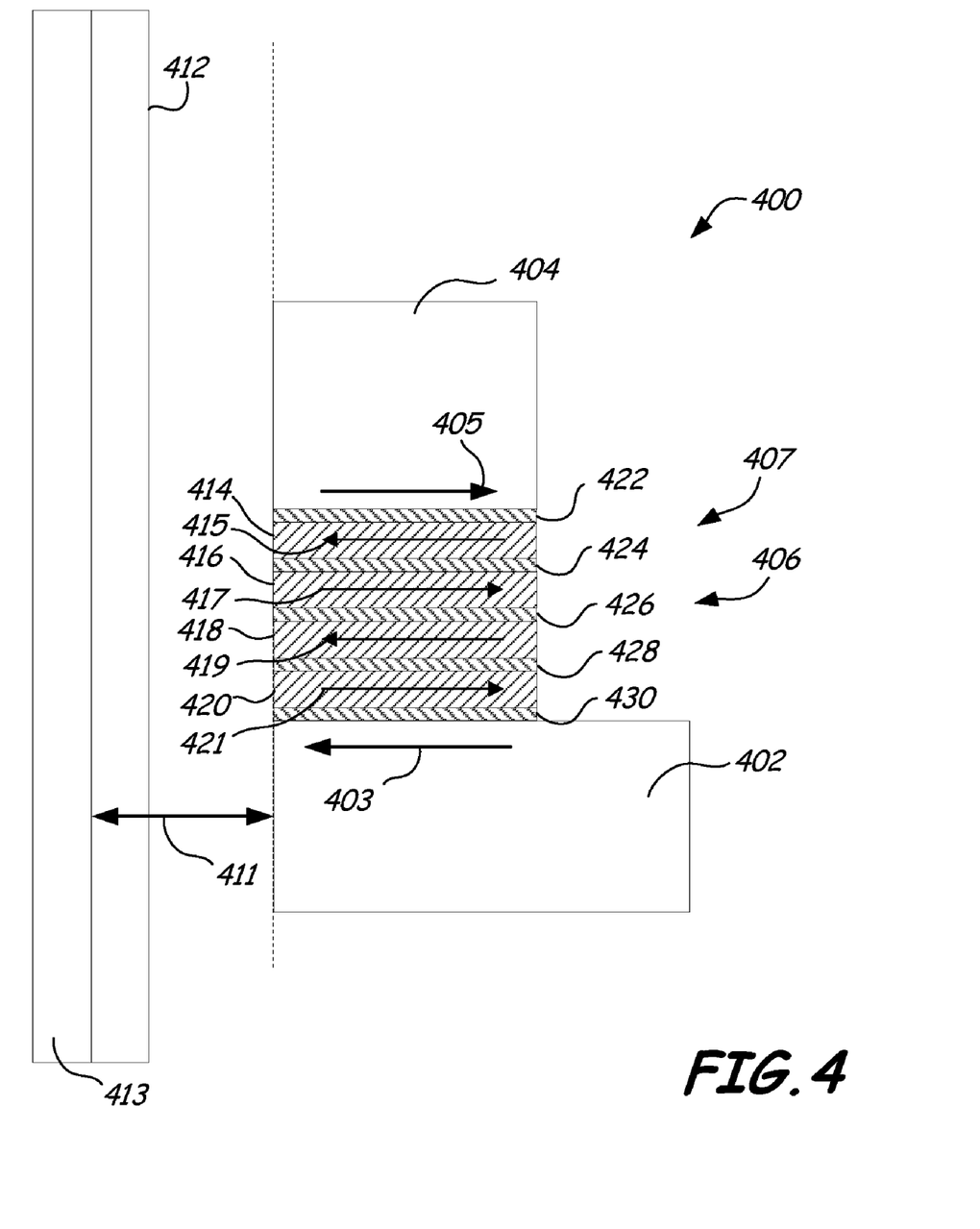
FIG. 4 illustrates one embodiment of an exemplary writer including an antiferromagnetic superlattice positioned in a gap.

FIG. 4 illustrates one embodiment of a writer 400 including an antiferromagnetic superlattice 407 positioned between a pole 402 and a shield 404. The pole 402 and shield 404 are illustratively similar to pole 202 and shield 204 illustrated in FIG. 2.

The antiferromagnetic superlattice 407 comprises a multilayer block having a plurality of layers positioned in a gap 406 between the writer pole 402 and the writer shield 404. In one embodiment, the gap 406 between the pole 402 and shield 404 is greater than 1 nm. In one embodiment, the gap 406 between the writer pole 402 and writer shield 404 is substantially similar to or the same as the separation 411 between a tip of the write pole 402 and the soft under layer (SUL) 413 of the storage media 412 to provide suitable gradient and field strength and minimize shunting of the write pole field. In one embodiment, the gap 406 between the writer pole 402 and writer shield 404 is approximately 20-50 nm.

The antiferromagnetic superlattice 407 includes two or more layers of magnetic materials and three or more layers of non-magnetic materials. In the illustrated embodiment, the antiferromagnetic superlattice 407 comprises a multilayer block having alternating layers of magnetic and non-magnetic material. The layers of magnetic material comprise ferromagnetic material layers 414, 416, 418, and 420 and the layers of non-magnetic material comprise non-ferromagnetic material layers 422, 424, 426, 428, and 430. The non-ferromagnetic layers provide antiferromagnetic coupling between adjacent layers of ferromagnetic material. As illustrated, the non-ferromagnetic layers 424, 426, and 428 separate ferromagnetic layers 414, 416, 418, and 420 and provide antiferromagnetic coupling to orient the magnetizations 415, 417, 419, and 421 of the magnetic layers such that adjacent layers have an orientation that is substantially anti-parallel. Further, non-ferromagnetic layer 422 separates ferromagnetic layer 414 and front shield 404 and non-ferromagnetic layer 430 separates ferromagnetic layer 420 and write pole 402. The antiferromagnetic superlattice is configured to orient the magnetization 403 of pole 402 and magnetization 405 of shield 404 such that the magnetizations are substantially anti-parallel and substantially perpendicular to a surface the storage medium 412.

Examples of materials that can be used for the ferromagnetic layers 414, 414, 418, and 420 include, but are not limited to, the ferromagnetic materials discussed above with respect to FIG. 2 (e.g., Fe, Co, Ni, FeCo, FeNi, CoFeNi, and/or combinations thereof). It is noted that one or more of the ferromagnetic layers 414, 416, 418, and 420 can include the same, similar, and/or different materials.

Examples of materials that can be used for the non-ferromagnetic layers 422, 424, 426, 428, and 430 include, but are not limited to, the non-ferromagnetic materials discussed above with respect to FIG. 2 (e.g., Ru, Cr, Ir, Rh, Cu, Mn, Ag, Au, and/or combinations thereof) or any other material capable of providing antiferromagnetic coupling between adjacent ferromagnetic layers. It is noted that one or more of the non-ferromagnetic layers 422, 424, 426, 428, and 430 can include the same, similar, and/or different materials.

In accordance with one embodiment, the antiferromagnetic superlattice 407 has "N" layers of ferromagnetic material and "N+1" layers of non-ferromagnetic layers. In the example of FIG.4, each of the plurality of ferromagnetic layers 414, 414, 418, and 420 comprise similar or the same thicknesses such that the magnetizations 415, 417, 419, and 421 of each ferromagnetic layer have substantially the same magnitude. Further, while the antiferromagnetic superlattice 407 is illustrated as including 4 layers of magnetic material and 5 layers of non-magnetic materials it is noted that superlattice 407 can comprise other configurations. In another example, the superlattice 407 includes 11 layers of non-ferromagnetic material (e.g., ruthenium (Ru)) and 10 layers of ferromagnetic material (e.g., cobalt (Co)). In one embodiment, the layers of ruthenium (Ru) each have a thickness of 0.5 nm and the layers of cobalt (Co) each have a thickness of 3 nm. The layers of cobalt and ruthenium are repeated to form an antiferromagnetic superlattice 407 having an overall thickness of 35.5 nm.

In accordance with one embodiment, the front shield 404 is formed with a small throat height or depth into the air-bearing surface. Keeping the throat height small, typically less than the break point, can operate to lower the effects of stray magnetic fields acting upon the front shield. Further, the materials and thicknesses of the layers that comprise the antiferromagnetic superlattice 407 can be chosen to provide maximum interlayer exchange. For example, the thickness of one or more of the layers of non-ferromagnetic material is selected to maximize the interlayer exchange across the material layer(s). Further, the materials of the superlattice 407 can be selected to provide minimum ferromagnetic moment (magnetic saturation×thickness), proper pairing of the materials to obtain high interlayer exchange coupling, and/or adequate control of the material thicknesses, textures, and interface quality.

Figure 5:
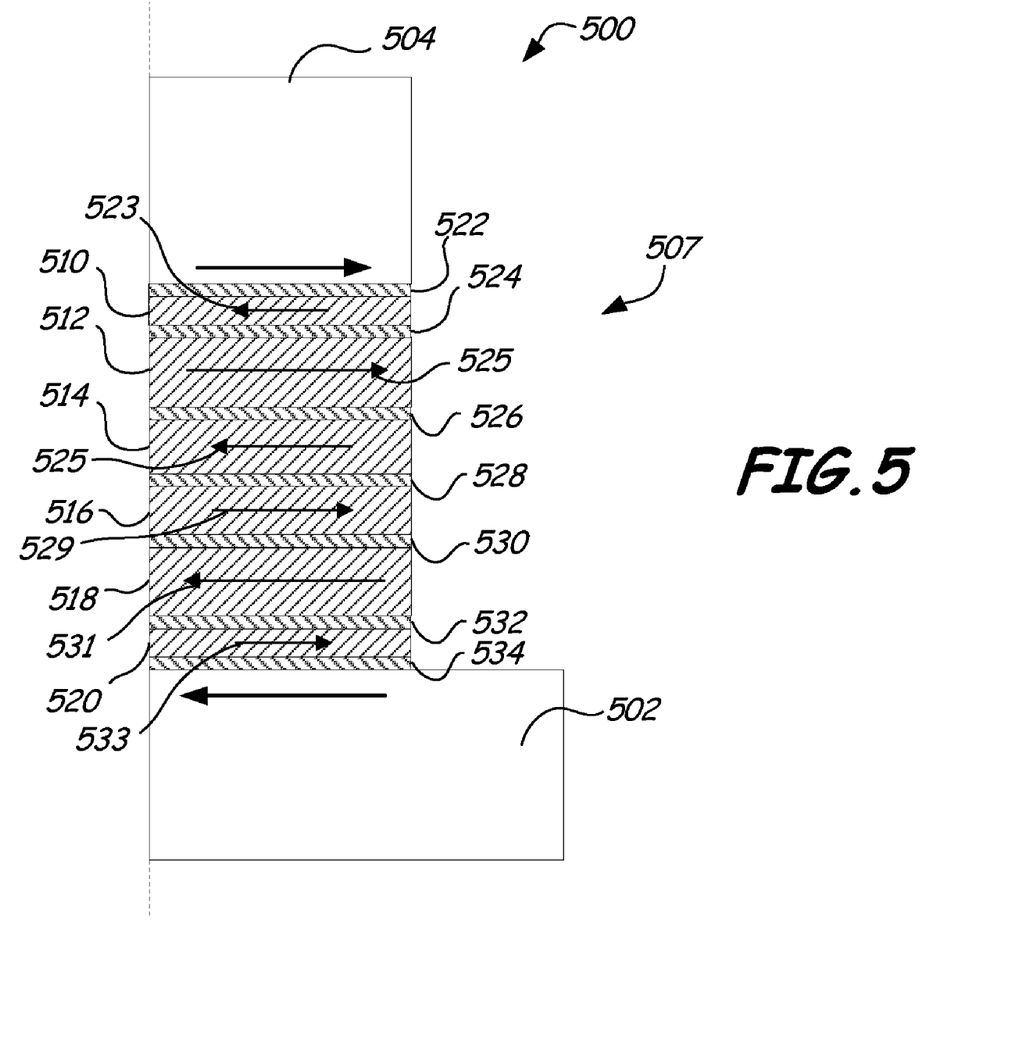
FIG. 5 illustrates one embodiment of an exemplary writer including an antiferromagnetic superlattice positioned in a gap.

FIG. 5 illustrates one embodiment of an antiferromagnetic superlattice 507 positioned in a gap between write pole 502 and write shield 504 of a writer 500. The antiferromagnetic superlattice 507 includes a plurality of alternating layers of ferromagnetic material (i.e., layers 510, 512, 514, 516, 518, 520) and layers of non-ferromagnetic material (i.e., layers 522, 524, 526, 528, 530, 532, 534). In the illustrated embodiment, one or more of the ferromagnetic layers 510, 512, 514, 516, 518, and 520 of the antiferromagnetic superlattice 507 have different sizes and/or shapes compared to one or more other ferromagnetic layers. For example, as illustrated in FIG. 5 some or all of the ferromagnetic layers 510, 512, 514, 516, 518, and 520 can have different thicknesses such that the magnetic magnitudes (represented by longer and shorter arrows 523, 525, 527, 529, 531, and 533) of one or more of the ferromagnetic layers are different. By adjusting the sizes (e.g., thicknesses) of the ferromagnetic layers 510, 512, 514, 516, 518, and 520, the magnetic characteristics of the antiferromagnetic superlattice 507 can be tailored to maintain the antiparallel alignment of the ferromagnetic layers. To illustrate, in some instances the magnetizations of layers of the antiferromagnetic superlattice (e.g., end ferromagnetic layers 510 and/or 520) may not align anti-parallel and instead form a "scissored" magnetization where the magnetization of the layers are rotated (for example, 90 degrees) with respect to adjacent layers. Varying the magnetic magnetizations of the ferromagnetic layers can allow the antiferromagnetic superlattice to be customized to maintain antiparallel alignment of the ferromagnetic layers.

Figure 6A:
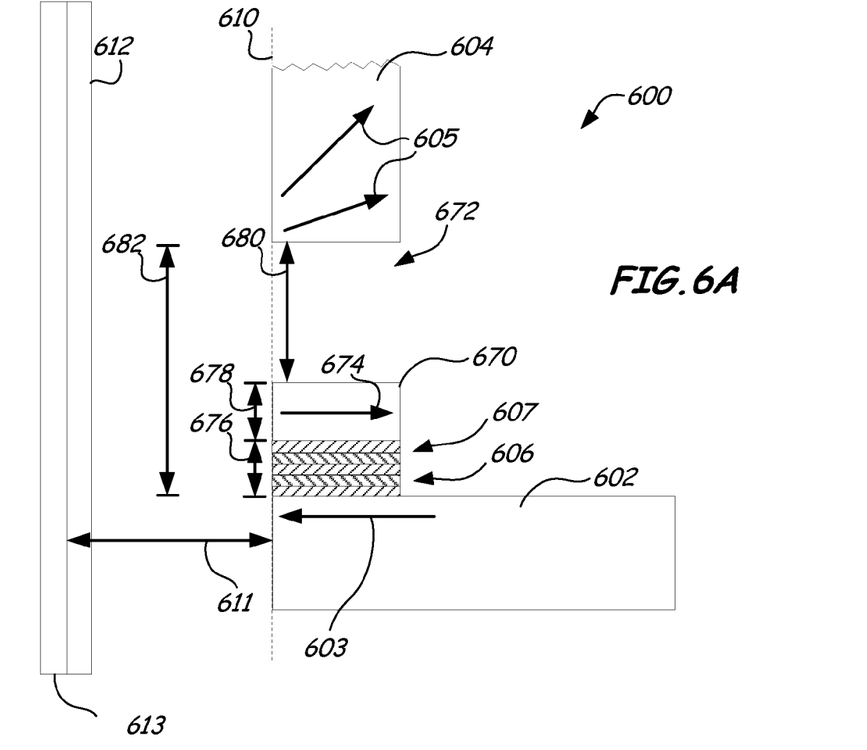
FIGS. 6A-6B illustrate one embodiment of an exemplary writer having an antiferromagnetic superlattice positioned in a gap.
Figure 6B:
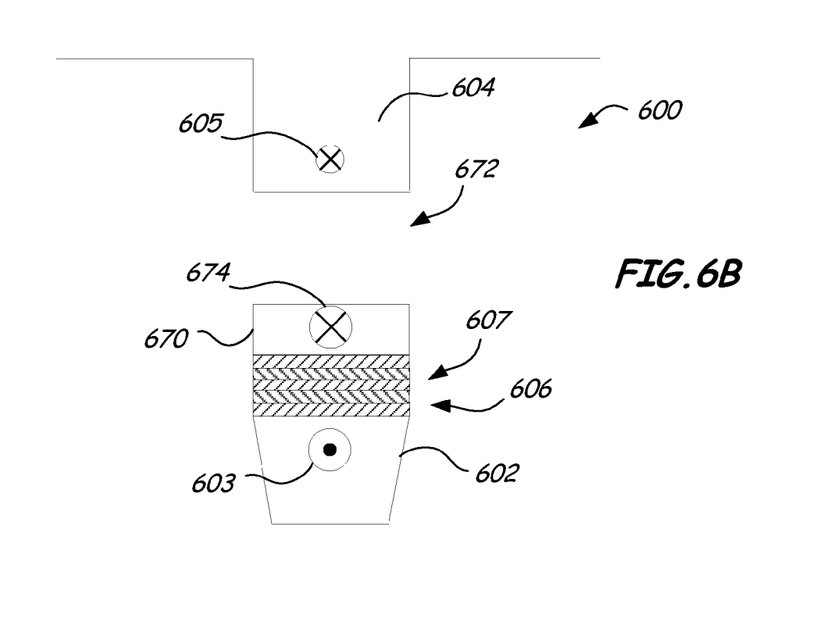

FIGS. 6A and 6B illustrate one embodiment of a writer 600 that includes a magnetic layer 670 positioned between a write pole 602 and front shield 604. FIG. 6A is a sectional view of writer 600 and FIG. 6B is an end view of writer 600 taken from the air-bearing surface 610. The magnetic layer 670 comprises a thin layer of magnetic material. As illustrated, magnetic layer 670 is a floating shield layer having a magnetic field 674 that is substantially antiparallel to the magnetic field 603 of the pole 603. Magnetic layer 670 is spaced apart from the write pole 602 to form a gap 606. Arrows 605 illustrate a magnetic orientation of the magnetic field in the front shield 604.

An antiferromagnetic superlattice 607 (such as superlattice 207, 407, and/or 507) is positioned in the gap 606 and is configured to orient the magnetic fields 603 and 674 of the write pole 602 and magnetic layer 670, respectively, to be anti-parallel and perpendicular to the air-bearing surface 610. The magnetic layer 670 is spaced apart from the write shield 604 by a secondary gap 672.

In the illustrated embodiment, width 682 of the gap between the shield 604 and pole 602 is approximately 50 nm and is similar to the separation 611 of the pole 602 and the soft under layer 613 of medium 612, which is approximately 45 nm. In this example, the width 676 of the gap 606 is approximately 10 nm and the width 680 of the secondary gap 672 is approximately 30 nm. The thickness 678 of the magnetic layer 670 is approximately 10 nm.

Figure 7A:
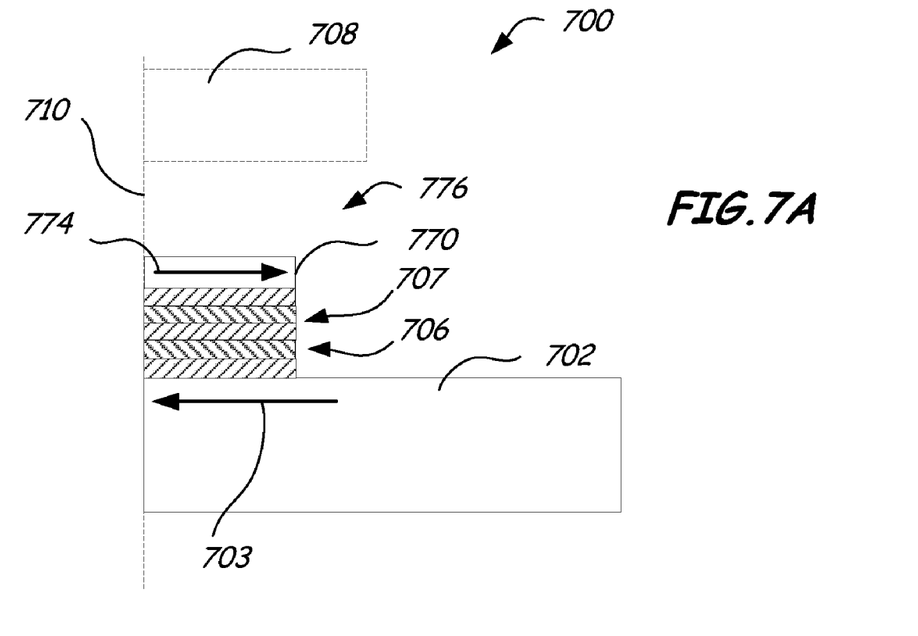
FIGS. 7A-7B illustrate one embodiment of an exemplary writer having an antiferromagnetic superlattice positioned in a gap.
Figure 7B:
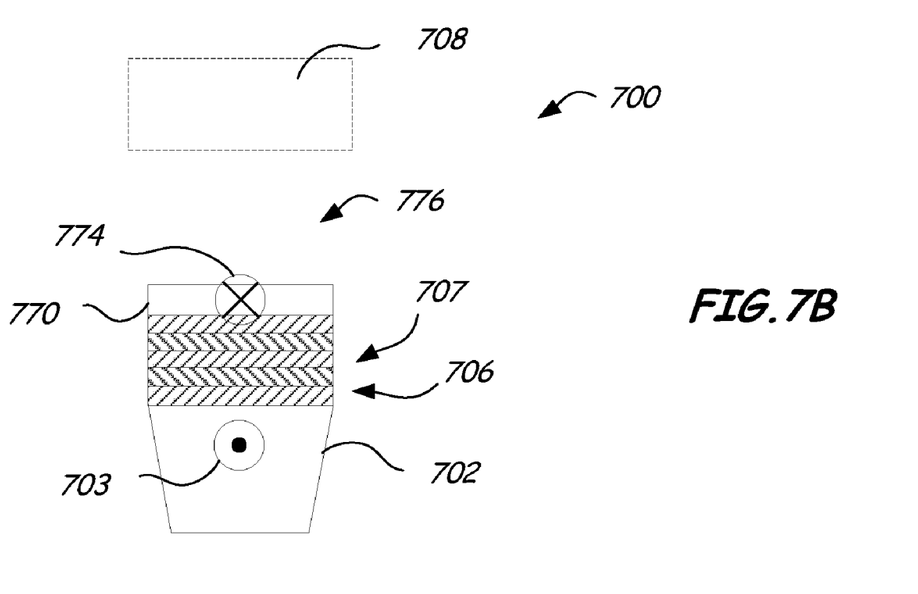

FIGS. 7A and 7B illustrate a writer 700 that includes a thin magnetic layer 770 spaced apart from a write pole 702 to define a gap 706 therebetween. Magnetic layer 770 is similar to layer 670 illustrated in FIG. 6. An antiferromagnetic superlattice 707 (such as superlattice 207, 407, 507 and/or 607) is positioned in the gap 706. Writer 700 is illustratively similar to writer 600 illustrated in FIGS. 6A and 6B but does not include a writer shield. In one embodiment, the magnetic layer 770 is positioned between the write pole 702 and a return pole 708. Magnetic layer 770 is spaced apart from the return pole to define a gap 776 therebetween. The antiferromagnetic superlattice 707 orients the magnetizations 703 and 774 of the write pole 702 and magnetic layer 770, respectively, to be anti-parallel and substantially perpendicular to the air-bearing surface 710.

Figure 8A:
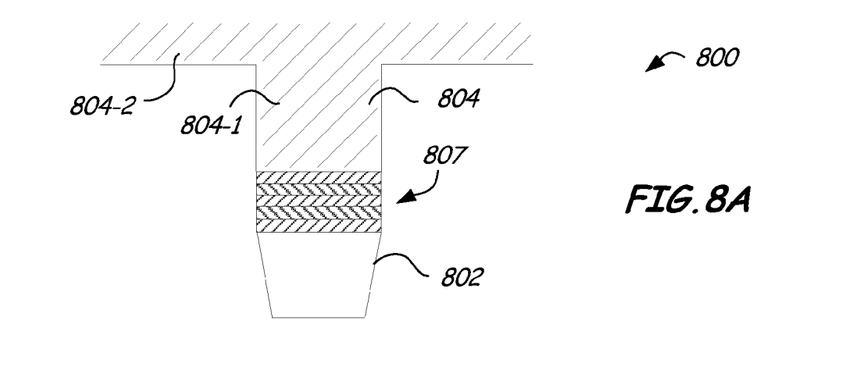
FIGS. 8A-8D illustrate embodiments of an exemplary writer having various shield configurations.
Figure 8B:
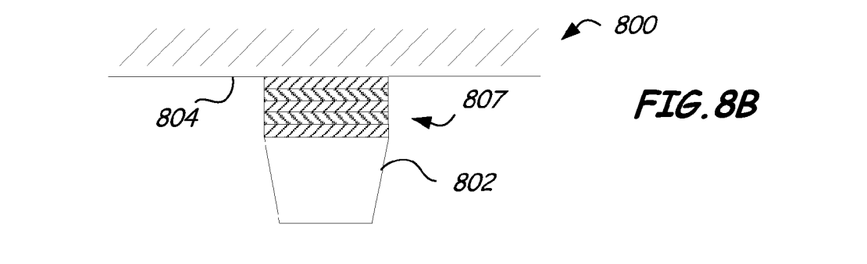

Further, it is noted that the writer can have various shield configurations. For instance, FIGS. 8A-8D are views taken from an air-bearing surface of an exemplary writer 800. Writer 800 includes a write pole 802 that is spaced apart from a front shield 804 to define a gap therebetween. An antiferromagnetic superlattice 807 (such as superlattice 207, 407, 507 and/or 607) having a plurality of layers of magnetic and non-magnetic material is positioned in the gap. In FIG. 8A, the front shield 804 has a "notched" configuration in which the shield 804 has a first notched portion 804-1 that protrudes from a second base portion 804-2. In FIG. 8B, the shield 804 does not include a notched portion and instead has a "flat" configuration.

Figure 8C:
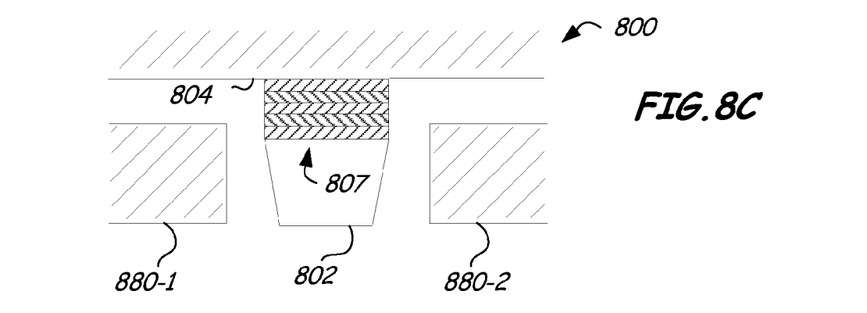
Figure 8D:
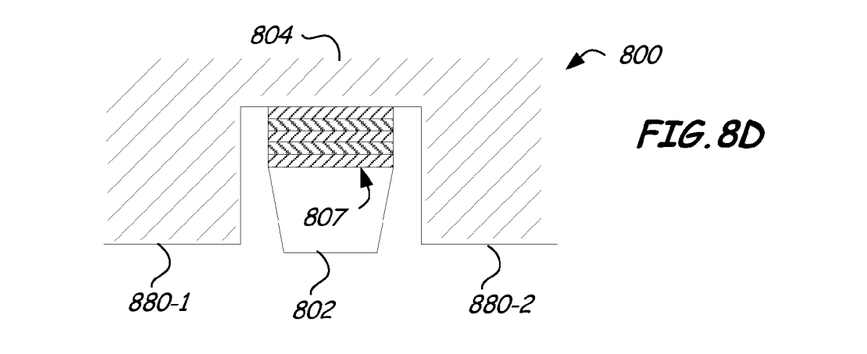

FIGS. 8C and 8D illustrate a shield configuration that includes a front shield 804 and side shields 880. The side shields comprise a first side shield 880-1 and a second side shield 880-2. The first side shield 880-1 is positioned on a side of write pole 802 that is opposite the second side shield 880-2. In FIG. 8C, the side shields 880 are formed separate and spaced apart from the front shield 804. In FIG. 8D, the side shields 880 are formed integrally with the front shield 804. Particularly, by "integrally" in these embodiments it is meant that the side shields 880 and front shield 804 are unitarily constructed.

Figure 9A:
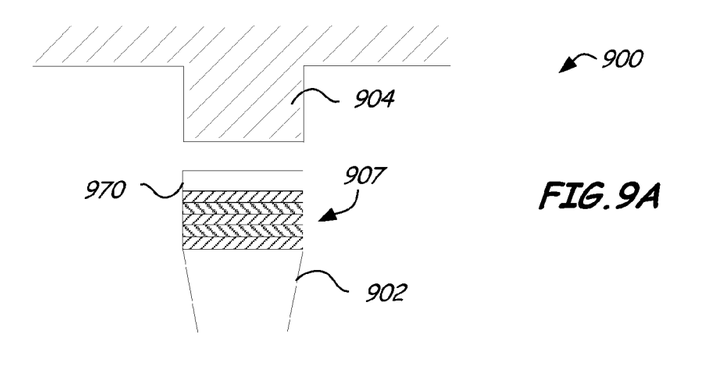
FIGS. 9A-9E illustrate embodiments of another exemplary writer having various shield configurations.
Figure 9B:
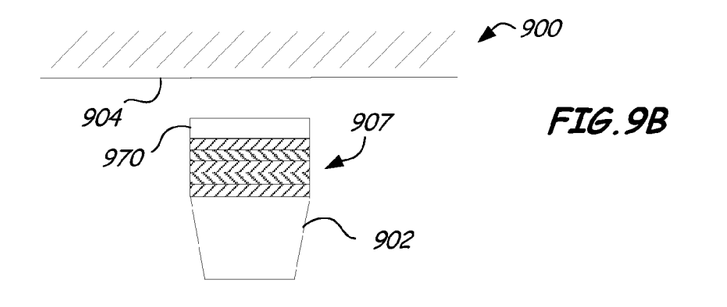
Figure 9C:
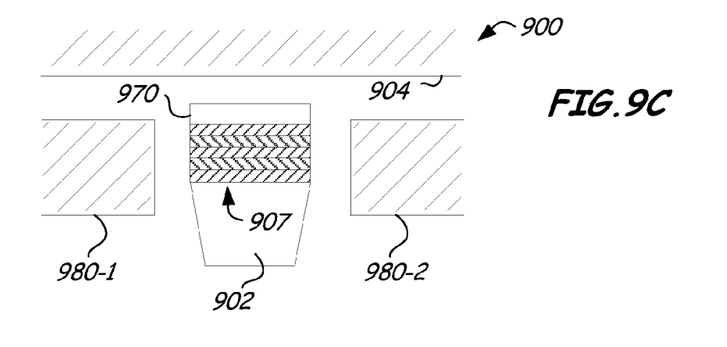
Figure 9D:
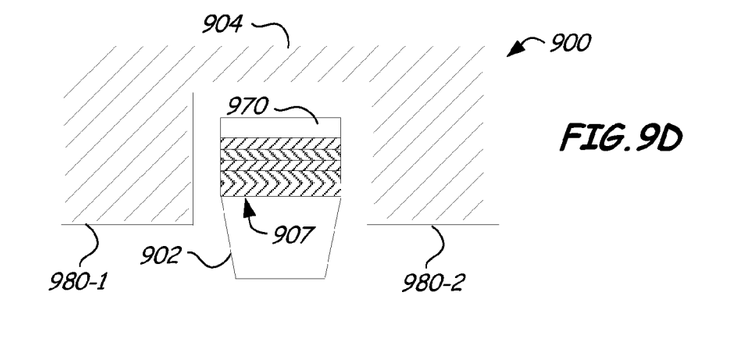
Figure 9E:
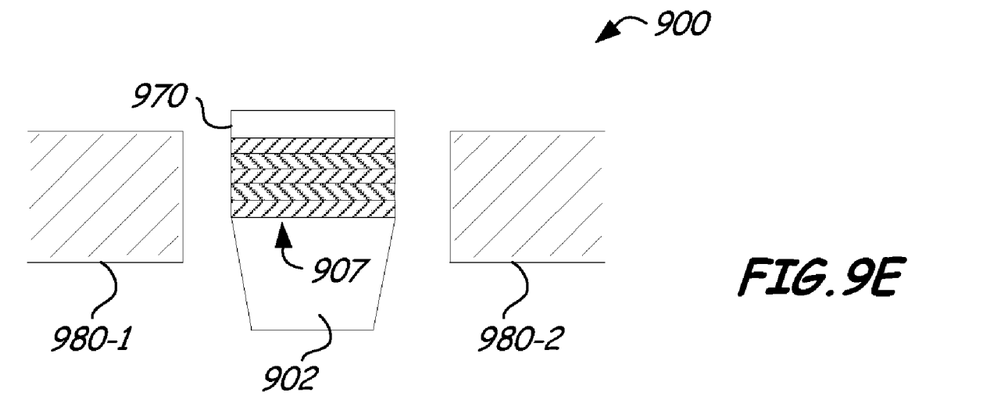

FIGS. 9A-9E illustrate various configurations of a writer 900. Writer 900 includes a write pole 902 and a write shield 904. In contrast to writer 900, writer 900 includes a magnetic floating shield layer 970, such as layer 670 illustrated in FIGS. 6A and 6B. In FIG. 9A, write shield 904 includes a "notched" configuration. In FIG. 9B, write shield 904 includes a flat configuration. FIGS. 9C and 9D illustrate various configurations of write shield 904 that includes side shield 980-1 and 980-2. FIG. 9E illustrates one embodiment of writer 900 and includes a magnetic layer 970, but does not include front shield.

Figure 10A:
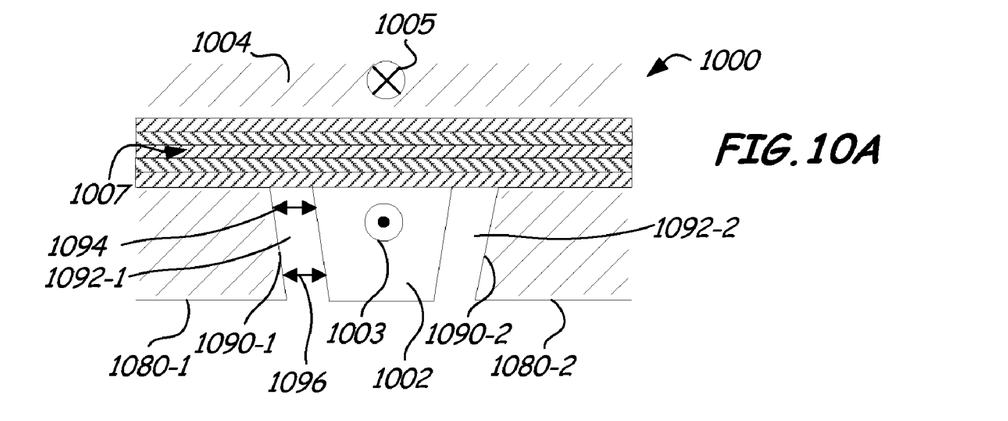
FIGS. 10A-10C illustrate one embodiment of an exemplary writer including an antiferromagnetic superlattice positioned in a gap.
Figure 10B:
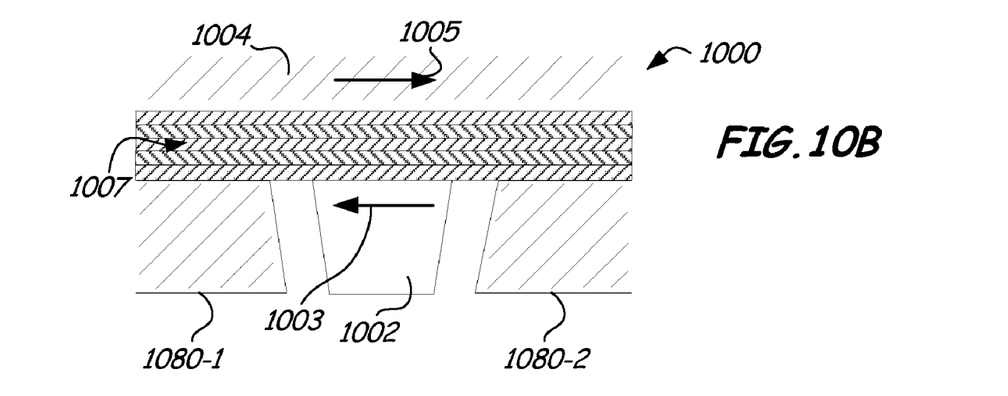
Figure 10C:
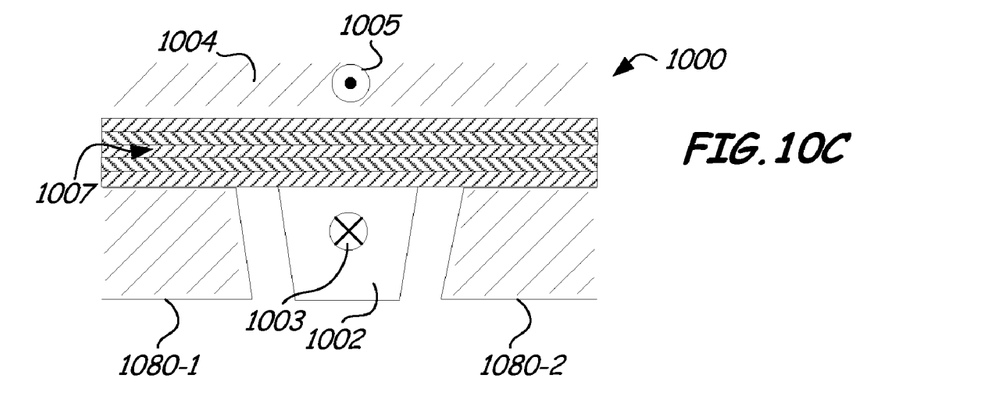

FIGS. 10A-10C illustrate one embodiment of a writer 1000. FIGS. 10A-10C are views of writer 1000 taken from the air bearing surface. Writer 1000 includes a magnetic pole 1002 and a magnetic front shield 1004. An antiferromagnetic superlattice 1007 (such as superlattice 207, 407, 507, and/or 607) having a plurality of layers of magnetic and non-magnetic material is positioned in the gap between the main pole 1002 and front shield 1004. The antiferromagnetic superlattice 1007 is configured to orient the magnetizations 1003 and 1005 of the main pole 1002 and front shield 1004, respectively, to be substantially antiparallel. FIG. 10A illustrates writer 1000 in a positive write (i.e., magnetization 1003 is oriented toward the storage medium). FIG. 10B illustrates writer 1000 in remanence (i.e., the magnetizations 1003 and 1005 are parallel to the storage medium such that the writer 1000 is not writing data to the storage medium). FIG. 10C illustrates writer 1000 in a negative write (i.e., magnetization 1003 is oriented away from the storage medium).

As shown in FIGS. 10A-10C, the antiferromagnetic superlattice 1007 extends along a length of the front shield 1004 and is positioned between the pole 1002 and front shield 1004. The multilayer block 1007 is also positioned between each of the side shields 1080-1 and 1080-2 and the front shield 1004.

In the embodiment of FIG. 10A-10C, side shields 1080-1 and 1080-2 include a tapered portion 1090-1 and 1090-2, respectively. The tapered portions 1090-1 and 1090-2 are configured such that a gap 1092-1 and 1092-2, respectively, that extends between the side shields and the pole 1004 has a substantially uniform width along a length of the pole 1002. In other words, in one embodiment a width 1094 of gap 1092-1 is substantially similar to a width 1096.

Figure 11A:
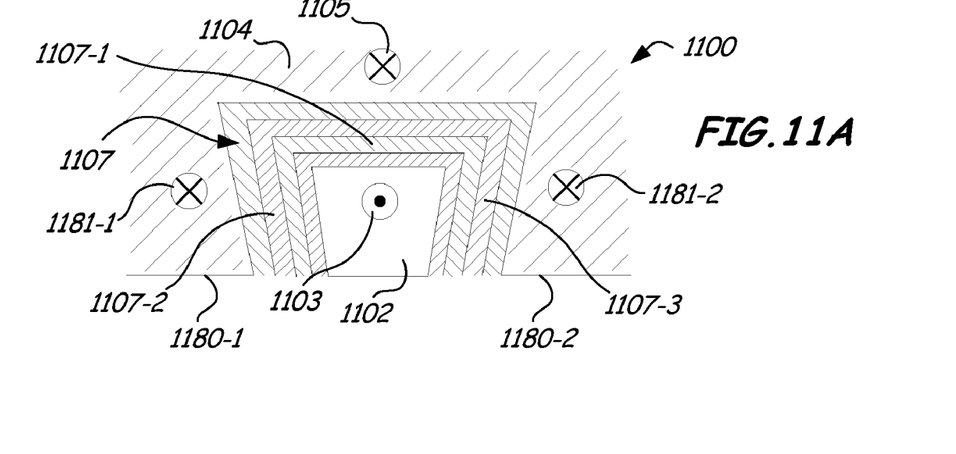
FIGS. 11A-11C illustrate one embodiment of an exemplary writer including an antiferromagnetic superlattice positioned in a gap.
Figure 11B:
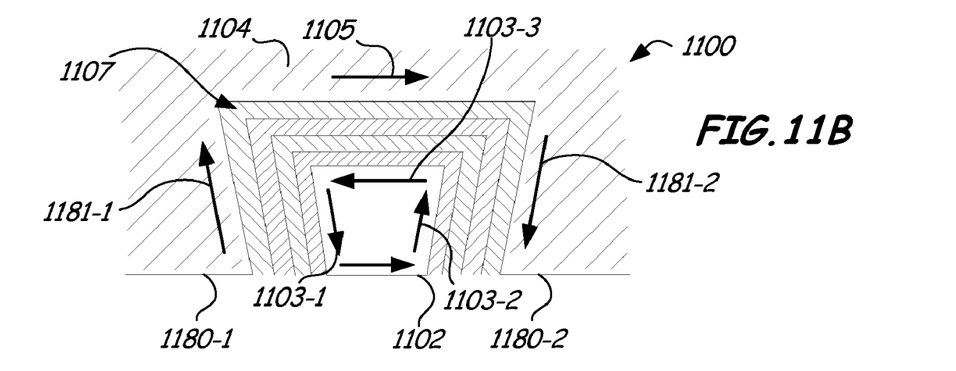
Figure 11C:
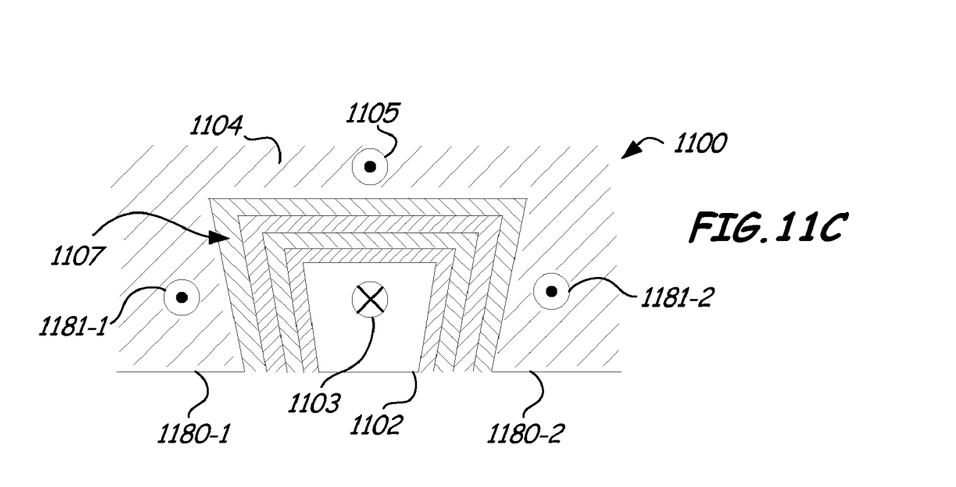

FIGS. 11A-11C illustrate one embodiment of a writer 1100. FIGS. 11A-11C are views of writer 1100 taken from the air bearing surface. Writer 1100 includes a main pole 1102 and a front shield 1104. First and second side shields 1180-1 and 1180-2 are positioned on opposite sides of the main pole 1102. In one embodiment, side shields 1180-1 and 1180-2 are substantially similar to side shields 1080-1 and 1082-2, illustrated in FIG. 10.

In the embodiment illustrated in FIGS. 11A-11C, the front shield 1104 and side shield 1180-1 and 1180-2 are connected and/or formed integrally. Particularly, by "integrally" in these embodiments it is meant that the side shields 1180 and front shield 1104 are unitarily constructed. However, in other embodiments the front shield 1104 and side shields 1180-1 and 1180-2 can be separate and/or spaced apart to form a gap. FIG. 11A illustrates writer 1100 in a positive write orientation. FIG. 11B illustrates writer 1100 in remanence. FIG. 11C illustrates writer 1100 in a negative write orientation.

As illustrated in FIGS. 11A-11C, an antiferromagnetic superlattice 1107 comprises a first portion 1107-1, a second portion 1107-2, and a third portion 1107-3. The first portion 1107-1 is positioned in the gap between the pole 1102 and front shield 1104. The second portion 1107-2 is positioned in the gap between the pole 1102 and side shield 1180-1. The third portion 1107-3 is positioned in the gap between the pole 1102 and side shield 1180-2. In one embodiment, the first portion 1107-1, second portion 1107-2, and third portion 1107-3 are integrally formed. Particularly, by "integrally" in these embodiments it is meant that the first portion 1107-1, second portion 1107-2, and third portion 1107-3 are unitarily constructed. In another embodiment, the first portion 1107-1, second portion 1107-2, and third portion 1107-3 can be separate and/or spaced apart.

In one embodiment, the gap between the pole 1102 and front shield 1104 is similar to the gaps between the pole 1102 and each of side shields 1180-1 and 1180-2. In another embodiment, the gaps formed between the pole 1102 and side shields 1180-1 and 1180-2 are greater than or less than the gap formed between the pole 1102 and front shield 1104. In one embodiment, the antiferromagnetic superlattice structure positioned between the pole 1102 and side shields 1180-1 and/or 1180-2 have a structure that is different than the antiferromagnetic superlattice structure positioned between the pole 1102 and front shield 1104.

Antiferromagnetic superlattice 1107 is configured to orient the magnetic fields of the pole 1102, front shield 1104, and side shields 1180-1 and 1180-2. As shown in FIGS. 11A and 11C, a magnetization 1181-1 of side shield 1180-1 is substantially anti-parallel to a magnetization 1103 of pole 1102 and a magnetization 1181-2 of side shield 1180-2 is substantially anti-parallel to a magnetization 1103 of pole 1102. A magnetization 1105 of front shield 1104 is also substantially anti-parallel to magnetization 1103 of pole 1102.

As shown in FIG. 11B, the magnetization of pole 1102 is parallel to a surface of the storage medium. The magnetization 1181-1 is substantially anti-parallel to a magnetization 1103-1 of a portion of pole 1102. Similarly, the magnetization 1181-2 is substantially anti-parallel to a magnetization 1103-2 of a portion of pole 1102. A magnetization 1105 of front shield 1104 is substantially anti-parallel to a magnetization 1103-3 of a portion of pole 1102.

Figure 12:
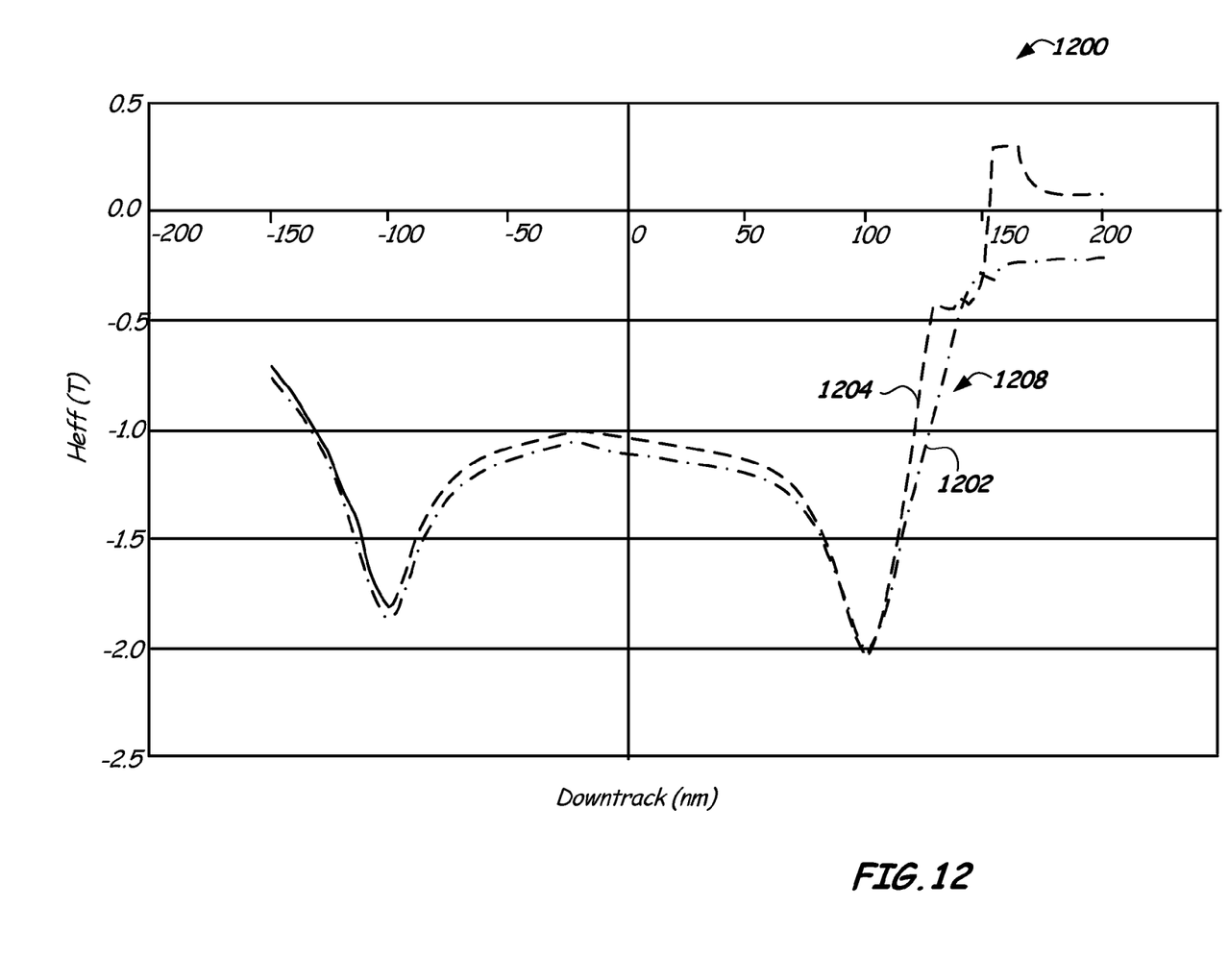
FIG. 12 illustrates magnetic field characteristics of an exemplary writer.

FIG. 12 provides a graph 1200 that illustrates the magnetic field characteristics (represented by numeral 1202) of an exemplary writer having a non-magnetic write gap (e.g., writer 100 illustrated in FIG. 1) and the magnetic field characteristics (represented by numeral 1204) of an exemplary writer having an antiferromagnetic superlattice, under one embodiment, positioned in the write gap (e.g., writer 200 illustrated in FIG. 2). In graph 1200, the horizontal axis represents the downtrack distance, as measured from a center of the main pole along a plane of the media. In other words, the downtrack distance at "0" represents the center of the main pole. The vertical axis represents the magnetic field in the media. Graph 1200 plots the magnetic fields in the media from the main pole, across the write gap, and into the shield region. Reference numeral 1208 calls out the portion of the graph illustrating the magnetic field gradients proximate a trailing edge of the main pole for both exemplary writers.

It is to be understood that even though numerous characteristics and advantages of various embodiments of the invention have been set forth in the foregoing description, together with details of the structure and function of various embodiments of the disclosure, this disclosure is illustrative only, and changes may be made in detail, especially in matters of structure and arrangement of parts within the principles of the present disclosure to the full extent indicated by the broad general meaning of the terms in which the appended claims are expressed. For example, the particular elements may vary depending on the particular application for the system or method while maintaining substantially the same functionality without departing from the scope and spirit of the present disclosure and/or the appended claims.

What is claimed is:

1. An apparatus having magnetic properties, the apparatus comprising:
    a magnetic pole;
    a magnetic shield; and
    a multilayer block positioned between the pole and the shield and comprising a plurality of layers, wherein at least one of the plurality of layers comprises a magnetic material, the multilayer block configured to antiferromagnetically couple the pole and the shield.

2. The apparatus of claim 1 comprising a transducer having a data write portion, and wherein the magnetic shield comprises a magnetic front shield of the write portion, and the magnetic shield further comprises a notch portion.

3. The apparatus of claim 1, wherein a magnetization of the pole is in a first direction and a magnetization of the shield is in a second direction that is substantially anti-parallel to the first direction.

4. The apparatus of claim 3, wherein the multilayer block comprises a plurality of ferromagnetic layers including ferromagnetic material and a plurality of non-ferromagnetic layers including non-ferromagnetic material, wherein one or more of the non-ferromagnetic layers provide an interlayer exchange coupling to antiferromagnetically couple adjacent ferromagnetic layers.

5. The apparatus of claim 4, wherein the multilayer block comprises alternating layers of ferromagnetic material and non-ferromagnetic material.

6. The apparatus of claim 4, wherein at least one of the ferromagnetic layers comprises a material selected from the group consisting of cobalt (Co), iron (Fe), nickel (Ni), iron cobalt (FeCo), iron nickel (FeNi), and cobalt iron nickel (CoFeNi), and wherein at least one of the non-ferromagnetic layers comprises a material selected from the group consisting of ruthenium (Ru), chromium (Cr), iridium (Jr), rhodium (Rh), copper (Cu), manganese (Mn), silver (Ag), and gold (Au).

7. The apparatus of claim 3, and further comprising a magnetic layer positioned between the pole and the shield, the magnetic layer being spaced apart from the shield to form a gap therebetween, wherein the multilayer block is positioned in the gap between the pole and the magnetic layer.

8. The apparatus of claim 4, wherein the apparatus is configured to magnetically store data to a storage medium, the apparatus comprising an air-bearing surface that faces the storage medium, and wherein each of the plurality of layers include a surface that defines a plane that is substantially perpendicular to the bearing surface.

9. The apparatus of claim 1, wherein the magnetic shield comprises a front shield of the magnetic pole, and wherein the apparatus further comprises first and second side shields positioned on opposite sides of the magnetic pole.

10. The apparatus of claim 9, wherein the multilayer block comprises:
    a first portion positioned between the front shield and the magnetic pole;
    a second portion positioned between the first side shield and the magnetic pole; and
    a third portion positioned between the second side shield and the magnetic pole, wherein the first, second, and third portions of the multilayer block are integrally fanned.

11. A transducer comprising:
    a write pole comprising a first ferromagnetic element;
    a second ferromagnetic element spaced apart from the first ferromagnetic element to define a gap therebetween; and
    a multilayer block positioned in the gap and configured to antiferromagnetically couple the first ferromagnetic element and the second ferromagnetic element, the multilayer block including at least two layers of ferromagnetic material spaced apart by a non-magnetic spacer layer.

12. The transducer of claim 11, wherein the second ferromagnetic element comprises a magnetic front shield of the magnetic write pole.

13. The transducer of claim 12, and further comprising first and second side shields positioned on opposite sides of the magnetic write pole, wherein the multilayer block is positioned between the first side shield and the write pole and between the second side shield and the write pole.

14. The transducer of claim 11, wherein the multilayer block comprises alternating layers of magnetic material and non-magnetic material.

15. The transducer of claim 13, wherein the multilayer block extends between the first and second side shields and the magnetic front shield.

16. An apparatus comprising:
    a magnetic pole;
    a magnetic shield; and
    an antiferromagnetic superlattice positioned between the magnetic pole and the magnetic shield, wherein the antiferromagnetic superlattice orients the magnetizations of the magnetic pole and magnetic shield to be substantially anti-parallel to each other.

17. The apparatus of claim 16, wherein the antiferromagnetic superlattice comprises a multilayer block having a plurality of ferromagnetic layers and a plurality of non-ferromagnetic layers.

18. The apparatus of claim 17, wherein the multilayer block comprises alternating layers of ferromagnetic material and non-ferromagnetic material, wherein the plurality of non-ferromagnetic layers provide an interlayer exchange coupling that anti-ferromagnetically couples adjacent ferromagnetic layers.

19. The apparatus of claim 18, wherein a first surface of the antiferromagnetic superlattice faces and is adjacent to the magnetic pole, the first surface being formed by one of the non-ferromagnetic layers, and wherein a second surface of the antiferromagnetic superlattice faces and is adjacent to the magnetic shield, the second surface being formed by one of the non-ferromagnetic layers.

20. The apparatus of claim 16, wherein the magnetic shield comprises a front shield of the magnetic pole, and wherein the apparatus further comprises first and second side shields positioned on opposite sides of the magnetic pole, the antiferromagnetic superlattice being positioned between the pole and the front shield and between at least one of the side shields and the pole.

* * * * *